(No Model.)　　　　　　　　　　　　　　　3 Sheets—Sheet 1.
J. C. COCHRANE.
MACHINE FOR FORMING SCREW THREADS ON BOLTS.
No. 316,010.　　　　　　　　Patented Apr. 21, 1885.
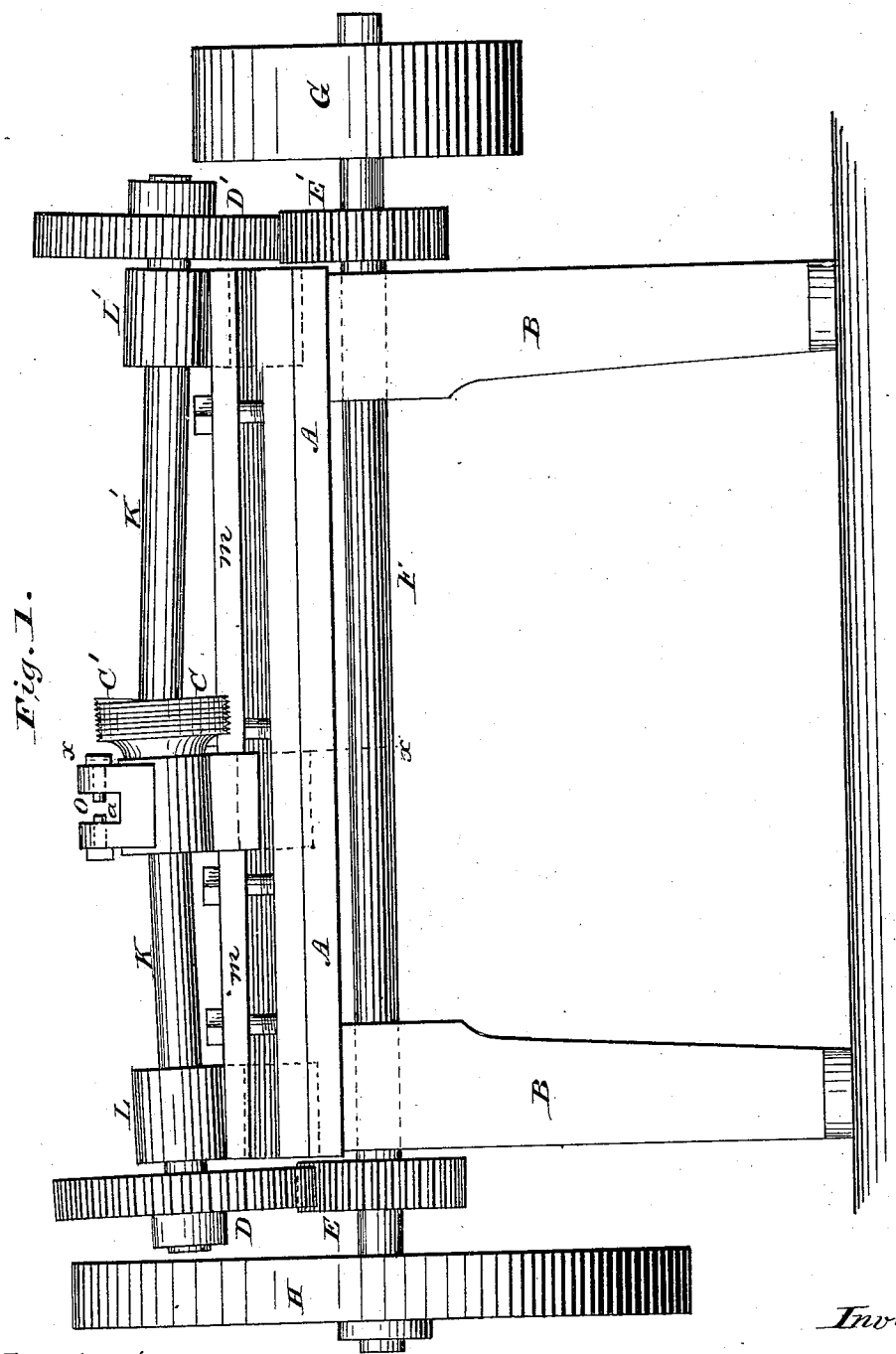
Witnesses:
Guy L. D. Motte
Alex. Simon
Inventor:
John C. Cochrane,
By T. C. Brecht,
Attorney.

(No Model.)  3 Sheets—Sheet 2.
J. C. COCHRANE.
MACHINE FOR FORMING SCREW THREADS ON BOLTS.
No. 316,010.  Patented Apr. 21, 1885.
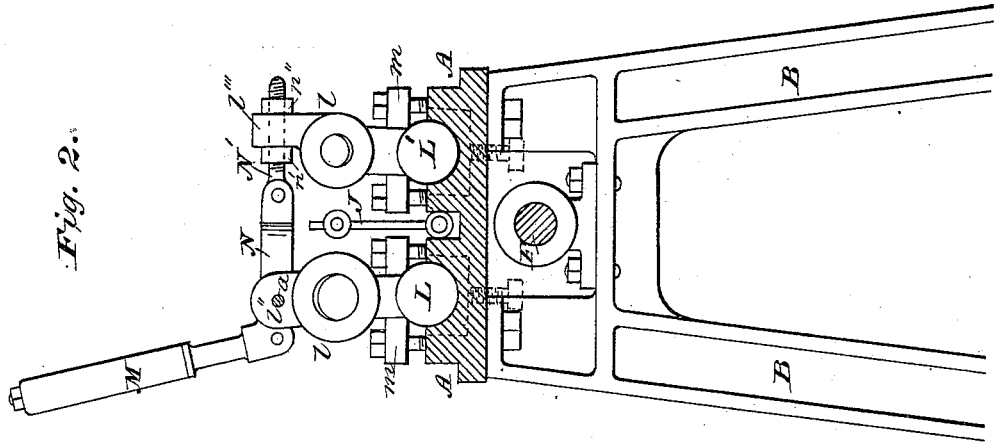
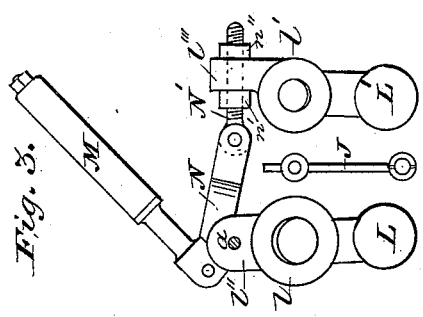
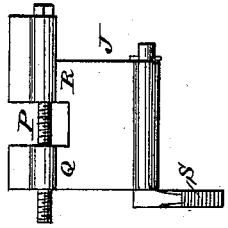
Witnesses:
Guy L. DeMotte
Alex Simon
Inventor:
John C. Cochrane,
By T. C. Brecht,
Attorney.

(No Model.) 3 Sheets—Sheet 3.
J. C. COCHRANE.
MACHINE FOR FORMING SCREW THREADS ON BOLTS.
No. 316,010. Patented Apr. 21, 1885.
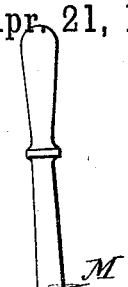
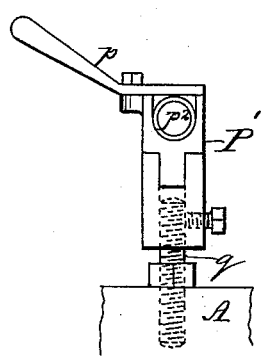
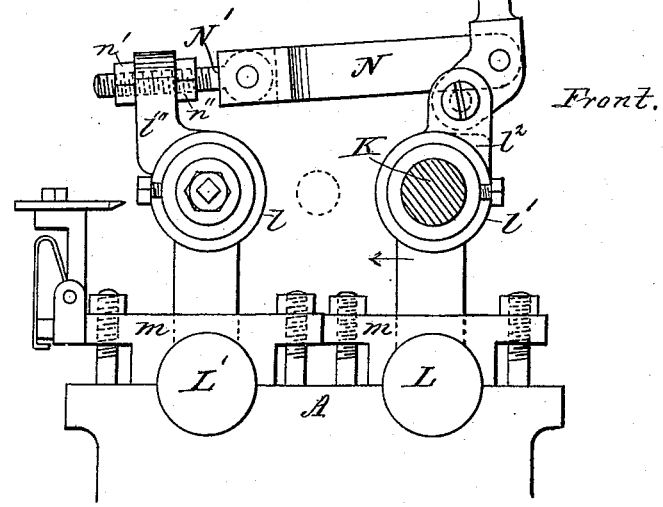
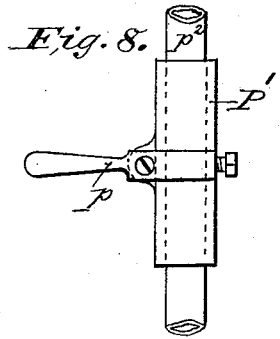
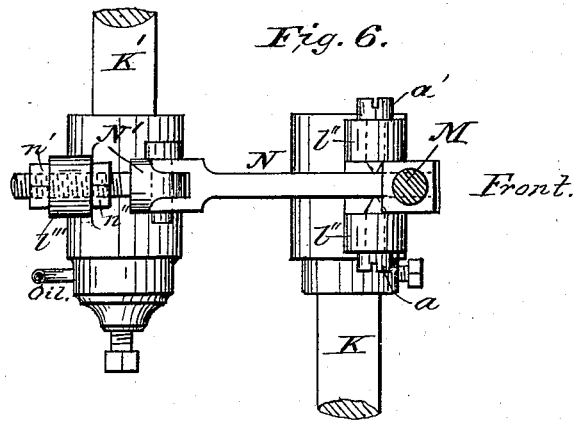
Witnesses:
G. L. D. Motte
Lewis C. Durham
Inventor,
John C. Cochrane,
By T. C. Brecht,
Attorney.

UNITED STATES PATENT OFFICE.

JOHN C. COCHRANE, OF FARMINGDALE, NEW JERSEY, ASSIGNOR OF ONE-SIXTH TO WM. H. BROOKS, OF ALEXANDRIA, VIRGINIA.

MACHINE FOR FORMING SCREW-THREADS ON BOLTS.

SPECIFICATION forming part of Letters Patent No. 316,010, dated April 21, 1885.

Application filed March 22, 1884. (No model.)

*To all whom it may concern:*

Be it known that I, JOHN C. COCHRANE, a citizen of the United States, residing at Farmingdale, in the county of Monmouth and State of New Jersey, have invented certain new and useful Improvements in Machinery for Forming Screw-Threads on Metal Bolts or Blanks; and I do hereby declare the following to be a full, clear, and exact description of the invention, such as will enable others skilled in the art to which it appertains to make and use the same.

My invention relates to improvements in that class of machines for forming screw-threads on bolts or blanks in which the threads are formed by rotary pressure or cross-rolling; and the object of the invention is to produce a machine by which said threads can be produced in a more perfect and superior manner than has been done heretofore.

My invention consists in the construction and arrangement of parts, as will be more fully described hereinafter, and more specifically pointed out in the claims, reference being had to the accompanying drawings, in which—

Figure 1 is a side elevation of the machine embodying my improvement. Fig. 2 is a cross-section of the same on the line *x x* of Fig. 1, representing the machine in the position it assumes when the rolls are impinging or pressing upon the blank while forming the screw-thread thereon. Fig. 3 shows the position of the manipulating-lever when the rolls are set off from each other so as to introduce a new blank between them. Fig. 4 is the support for the blanks while being rotated between the rolls, which support is also made to act as a gage for fixing the length of thread to be put on bolts of a given size. Fig. 5 is a side elevation of the link and its connections. Fig. 6 is a plain view of the same. Figs. 7 and 8 are detail views of the end bearings for the blanks.

The same letters of reference are used to designate the same parts in the different figures.

The operating parts of this machine are attached to the bed-plate A, which is supported on legs B B. The screw-thread is formed on the bolt or rod blank by two revolving rollers or dies, C and C', six inches, more or less, in diameter, having peripheral or annular grooves or threads on their faces, which impinge upon and gradually enter the blank from opposite sides. Said rolls have the same speed and direction of motion. One of these rolls is seen in full at C, Fig. 1, and in the rear of the same the roll C' is partly shown. The spindles of these rolls are arranged in vertically-parallel planes; but they are inclined to the horizontal plane at an angle equal to the rake or inclination of the required screw-thread, as shown in Fig. 1. Upon the outer ends of these spindles are secured the spur-wheels D D', which are driven by pinions E and E' on the opposite ends of the central shaft, F. On one end of the shaft F is secured a pulley, G, driven from a suitable belt, and on the other end of said shaft is placed a balance-wheel, H.

The mode of setting the spindles and rolls herein shown I consider the best that can be adopted for the purpose; but they may be placed in any convenient position, provided that the threads upon the rolls are so inclined or placed as to form the screw-threads upon the blank or bolt at the required angle.

In screw-threading headed bolts the blank is introduced to the required distance for the screw-thread to commence, and is passed through the supporter J. I usually make this supporter with a bearing for the blank on each side of the rolls; but in some cases one bearing may be dispensed with, as the opposing or counter motions of the rolls have the tendency to keep the revolving bolt in the central position between the two, as the front roll, C, has a motion on the bolt from above downward and the back roll, C', has a motion on the bolt from below upward, which induces the bolt to rotate on its axis. The supporter J may also be used as a gage to regulate the distance to which the threading is to be carried, as shown at P, Fig. 4. The part Q supports the blank behind the rolls, and the part R the portion in front of the rolls. This part R may be made of sufficient length to bring the threading-rolls to act upon the blank at the proper distance from the head, as indicated by the bolt shown in position, or there may be a sliding stop at R adjustable to any required distance. The support or gage J is pivoted to the part S, which is screwed into the bed-piece, and thus the part J is free to vibrate between the rolls, if need be. The rocking-arms L L' form the bearings for the roll-spindles K K', being raised at their ends, as shown at *l l'*. The outer arms are made shorter or longer than the inner arms, so as to give the roll-spindles the proper inclination to suit the angle or rake of the required thread, and also to give the least possible motion to the spur-wheels on the outer ends of the roll-spindles, thereby preventing the wheels and pinions dropping out of gear upon opening the rolls, which might otherwise take place. The opening and closing of the rolls is effected by the partial rotation of these arms in their bearings in the bed. These arms are secured to the bed-piece by caps *m m'*, and in setting the machine the spindle carrying the roll C' only need be adjusted to suit the size of the blanks that are to be operated upon, when the cap may be tightened, so as to prevent further motion till a different size of blank is to be worked upon; but, if preferred, one roll-spindle only need vibrate, the other roll-spindle being mounted in a pair of pedestals rigidly attached to the bed-piece. If desired, boxes may be employed in the bearings of the arms, and set-screws passing through the lower part of the bed-piece, so that said arms may be adjusted in case of wear or to suit the various pitches. The roll-spindles are connected with each other by a link, N, attached at one end to the lever M, and at the other, having a forked end, to an eyebolt, N'. This bolt passes through a lug, *l'''*, and is clamped on each side thereof by a nut, *n'* and *n''*, so as to adjust said link. The lever M is attached to a double lug, *l''*, on the rocker-arm L by pointed pivot screws or bolts *a* and *a'*, and is bent, as shown in Fig. 5, so that when the lever is in its locked position it rests upon the bottom between said lugs with the three joints in line. The screws *a a'* form the fulcrum for the lever, and the forward motion of said lever causes the rolls to come in contact with and enter the blank with increasing force, and the rolls are separated by the backward motion when the thread is finished, as shown in Fig. 3, which enables the operator to insert a new blank. The bolts or blanks upon which this mechanism is made to act should be of a soft nature—such as copper, brass, or Muntz metal; but if iron blanks are to be acted upon they should be annealed or made soft by heating; and in case of large bolts it may be necessary to make the iron red hot, and in threading red-hot bolts a small stream of water should be allowed to run upon the rolls and blank during the operation. The end bearings, P', for supporting the tubes through which the bolt-blanks are inserted are made adjustable, as shown at *q*, and are held in position by a cap and a hinged lever, *p*, as shown in Figs. 7 and 8. This bearing P' serves to support the end of long blanks, which are introduced through a pipe, P², clamped in the upper part by the cap and the lever *p'* and the bearing centrally between the rolls and at the end of the machine bed-plate.

This specification describes a machine that will form screw-threads on all kinds of metal blanks, whether such screws are to be used with metal nuts or are to be screwed directly into timber; but as is evident to any skilled mechanic, the mechanism may be altered in various ways without thereby changing its principle. I do not, therefore, limit myself to the exact details of construction herein shown and described, but claim the right under the patent to vary the same as convenience or the nature of the work to which the machine is to be applied may require, so long as I do not by such modification of construction change the principle of the invention.

Having thus described my invention, what I claim, and desire to secure by Letters Patent, is—

1. In a machine for forming screw-threads on bolts or rods, a pair of rolls provided with annular threads and secured to spindles mounted in vibrating arms of unequal length so as to open or close upon the blank and impress the screw-threads upon it, substantially as set forth.

2. The combination of a pair of rolls having annular screw-forming threads and operating spindles with arms of unequal length having bearings for said spindles, one or both of which spindles are made to vibrate, in the manner shown and specified.

3. The combination of the front and back spindles of the threading-rolls and their bearings with the link N, having an adjusting-screw and nuts at its back end, and connected at the opposite end to the lever M, arranged to operate as shown and described.

4. The combination of the lever M, attached to lugs on the rocker-arm L by pivot-screws *a a*, and the adjustable link N, connected to said lever and to a lug on the rocker-arm L', with a pair of annularly-threaded rolls secured to spindles journaled in said rocker-arms, as and for the purpose specified.

5. The combination of the adjustable support J for the blank while between the rolls, with the rolls having annular threads and mounted in vibrating arms of unequal length, substantially as and for the purpose specified.

6. The combination of a pair of annularly-threaded rolls secured to spindles mounted in arms, one or both of which vibrate, with a lever attached by pivot-screws to the front arm and connected by a link, N, and an adjustable eyebolt to a lug on the rear arm, all arranged to operate as shown and specified.

7. The combination of a pair of supporting-arms of unequal length and annularly-threaded rolls mounted on spindles, one or both of which vibrate, with the adjustable bearing P', for supporting the blanks, and the support J, all arranged substantially as set forth.

8. The machine for forming screw-threads herein described, consisting of a bed-plate, a pair of rolls having annular threads and secured to spindles mounted in arms of unequal length, one or both of which spindles vibrate, and operated by a lever and adjustable link-connection, with a support, J, an adjustable bearing for the blanks, and suitable gearing, all substantially at specified.

In testimony whereof I hereby affix my signature in presence of two witnesses.

JOHN C. COCHRANE.

Witnesses:
W. H. BARTOW,
A. B. HAMPTON.